June 26, 1945.  W. E. SWIFT, JR  2,378,954
TWO-WAY OVERRUNNING CLUTCH
Filed Aug. 6, 1943
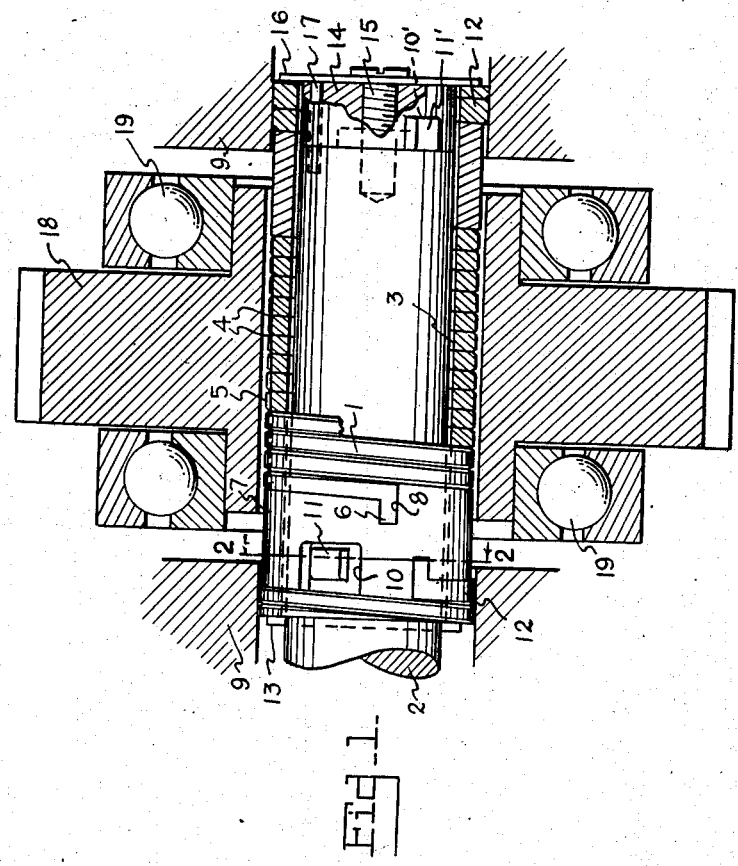
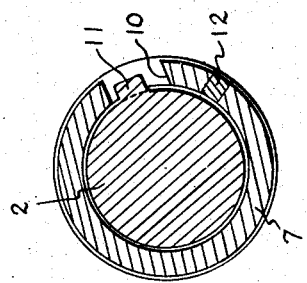
INVENTOR.
Willard E. Swift Jr.
ATTORNEYS.

Patented June 26, 1945

2,378,954

UNITED STATES PATENT OFFICE 2,378,954

TWO-WAY OVERRUNNING CLUTCH

Willard E. Swift, Jr., Worcester, Mass.

Application August 6, 1943, Serial No. 497,583

9 Claims. (Cl. 192—43)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains to a novel two-way overrunning clutch. Various uses for such a device will readily suggest themselves to those skilled in the art.

The operation of the device depends on the radial expansion of a spring engaged at one end by the driving member, as the result of resistance to free rotation interposed by an energizing spring coiled in continuation of the first spring and having light frictional engagement with a fixed surrounding member. The driven member surrounds the first or expanding spring and, when rotating faster, relieves the expansion pressure and causes the expansion spring to disengage, so that the driven member overruns. Such driving and energizing means for the first spring is provided at each end thereof and hence the device clutches and overruns in either direction.

The invention is fully disclosed by way of example in the following description and in the accompanying drawing in which:

Figure 1 is a longitudinal section of the device, and

Figure 2 is a section on the line 2—2 of Figure 1.

Reference to these views will now be made by use of like characters which are employed to designate corresponding parts throughout.

The principal clutching member is a comparatively heavy cylindrical helical spring 1, preferably of rectangular cross section. Through the spring extends a drive shaft 2, preferably spaced only slightly from the inner cylindrical wall 3 of the spring. The convolutions of the spring may normally be in mutual contact and are channeled at 4 along their edges and also transversely at 5 for lubrication. The ends 6 of the spring are bent out and anchored to collars 7 in notches 8 thereof. The collars are loose on the shaft and have a clearance of .001 to .002 in the surrounding bearings 9. Each collar has a notch 10 for loosely receiving a lug 11 or 11' extending from the shaft.

Attached to each collar 7 is an energizing spring 12 coiled in the same direction as the first spring but not necessarily of the same dimensions. The springs 12 are in normally light frictional engagement with stationary surrounding bearings 9.

The parts may be assembled on the shaft 2 from the free or outer end. The first spring 12 may stop against a cross pin 13 through the shaft 2. The lug 11 is readily received in the notch 10 of the corresponding collar 7. At the outer end, a separate shaft extension 14 carrying the lug 11' and received in the corresponding spring 12 is fastened by a screw 15. The screw also holds a plate 16 which retains the extension 14. The notches 10, 10' are oversized with respect to the lugs in the circumferential direction. After the extension 14 has been properly located, it is secured by a pin 17.

The driven member is illustrated as a gear 18 surrounding the spring 1 and spaced slightly therefrom when the mechanism is at rest. The gear may be held in bearings 19. On rotation of the shaft 2, one of the lugs engages and exerts pressure first against a side of the corresponding notch 10 or 10', causing this spring to rotate in the winding direction. However, the permanent drag of the farther energizing spring 12 on the corresponding collar 7 presents sufficient resistance to cause the spring 1 to be expanded radially into contact with the driven member 18. The pressure of the spring 1 against the internal surface of the member 18 is considerably greater than the pressure of the spring 12 on the stationary member 9, the amplification factor being as high as 60,000 in some cases, so that the member 18 may drive a substantial load. In the clutching action, the channels and grooves in the spring 1 receive the lubricant that is scraped or squeezed off the contacting surfaces of the spring and driven member.

The expansion and the clutching action of the spring 1, as noted, is due to the driving force of a lug 11 or 11' against a collar 7 in the unwinding direction of the spring. Consequently, if the member 18 tends to rotate faster than the shaft 2, it tends to drive the collar 7 faster than the lug, and the driving force is lost. The spring 2, therefore, disengages the member 18 and the latter overruns. The operation is the same in either direction of rotation of the shaft 2, since the mechanism is symmetrical with respect to a transverse central plane.

The clearance of the lugs 11 and 11' in their respective notches 10 accommodate the lag of the non-driven or tracting collar 7 during expansion of the spring 2.

Although a specific embodiment of the invention has been illustrated and described, it will be understood that various alterations in the details of construction may be made without departing from the scope of the invention as indicated by the appended claims.

What I claim is:

1. A two-way overrunning clutch comprising coaxial drive and driven members one within the other, a helical spring coiled between said members, means retarding rotation of said spring in either direction, and means on said drive member for selectively exerting pressure on the ends of said spring on rotation of said member to bind said spring against said driven member.

2. A two-way overrunning clutch comprising coaxial drive and driven members one within the other, a helical spring coiled between said members, energizing elements fixed to both ends of said spring, relatively fixed members surrounding said elements and adapted to resist rotation thereof, and means on said drive member for selectively exerting pressure on the ends of said spring on rotation of said member to bind said spring against said driven member.

3. A two-way overrunning clutch comprising coaxial drive and driven members one within the other, a helical spring coiled between said members, energizing springs fixed to both ends of the first named spring, relatively fixed members surrounding said energizing springs and frictionally engaging them, and means on said drive member for selectively exerting pressure on the ends of the first named spring on rotation of said member to bind said spring against said driven member.

4. A two-way over-running clutch comprising a helical spring, a drive shaft passing through said spring, means on said shaft for selectively exerting pressure on the ends of said spring in the unwinding direction, during rotation of said shaft, and means adapted to retard rotation of said spring in either direction.

5. A two-way overrunning clutch comprising a helical spring, a drive shaft passing through said spring, means on said shaft positioned to exert pressure selectively on the ends of said spring in the unwinding direction, during rotation of said shaft, energizing elements connected to both ends of said spring, a driven member loosely surrounding said spring and engageable with the outer surface of the first spring on radial expansion thereof, and relatively fixed members adapted to retard rotation of said elements.

6. A two-way overrunning clutch comprising a helical spring, a drive shaft passing through said spring, a collar attached to each end of said spring, portions of said shaft abutting said collars in the spring-unwinding direction, during rotation of said shaft, an energizing element fixed to each collar, a driven member loosely surrounding the first spring and engageable with the outer surface of the first spring on radial expansion thereof, and relatively fixed members surrounding the energizing elements and frictionally engaged thereby.

7. A two-way overrunning clutch comprising a helical spring, a drive shaft passing through said spring, means on said shaft for selectively exerting pressure on the ends of said spring in the unwinding direction, during rotation of said shaft, energizing springs fixed to both ends of the first spring, a driven member loosely surrounding the first spring and engageable with the outer surface of the first spring on radial expansion thereof, and fixed members surrounding the energizing springs and frictionally engaged thereby.

8. A two-way overrunning clutch comprising a helical spring, a drive shaft passing through said spring, a collar attached to each end of said spring and having a notch, projections from said shaft extending loosely into said notches and adapted to drive said collars in the spring-unwinding direction, energizing springs fixed to each collar, a driven member loosely surrounding the first spring and engageable with the outer surface of the first spring on radial expansion thereof, and fixed members surrounding the energizing springs and frictionally engaged thereby.

9. A two-way overrunning clutch comprising a fixed element, a driving element, a driven element, a clutching element driven by said driving element and adapted to engage said driven element on a cylindrical surface, and means operable by the interaction between the driving element and the fixed element for engaging said clutching element with said driven element in either direction of rotation of said driving element.

WILLARD E. SWIFT, Jr.